United States Patent
Kim et al.

(10) Patent No.: US 7,084,232 B2
(45) Date of Patent: Aug. 1, 2006

(54) METHOD FOR PREPARING HIGH MOLECULAR WEIGHT POLYCARBONATE

(75) Inventors: Jong-Hun Kim, Daejeon (KR); Boo-Gon Woo, Daejeon (KR); Eun-Duck Park, Incheon (KR); Mi-Jeung Hong, Yeosu (KR)

(73) Assignee: LG Chem, Ltd., Seoul (KR)

( * ) Notice: Subject to any disclaimer, the term of this patent is extended or adjusted under 35 U.S.C. 154(b) by 16 days.

(21) Appl. No.: 10/515,979

(22) PCT Filed: May 28, 2003

(86) PCT No.: PCT/KR03/01048

§ 371 (c)(1),
(2), (4) Date: Nov. 29, 2004

(87) PCT Pub. No.: WO03/100206

PCT Pub. Date: Dec. 4, 2003

(65) Prior Publication Data

US 2005/0215758 A1    Sep. 29, 2005

(30) Foreign Application Priority Data

May 29, 2002  (KR) .................... 10-2002-0030000

(51) Int. Cl.
*C08G 63/00* (2006.01)
(52) U.S. Cl. .................. 528/196; 422/131; 428/411.1; 428/412; 528/198
(58) Field of Classification Search ................ 422/131; 428/411.1, 412; 528/196, 198
See application file for complete search history.

(56) References Cited

U.S. PATENT DOCUMENTS

| 5,981,051 A | 11/1999 | Motegi et al. |
| 6,288,203 B1 | 9/2001 | Shishikura et al. |
| 6,365,702 B1 * | 4/2002 | Hait et al. .................. 528/196 |

FOREIGN PATENT DOCUMENTS

| EP | 0338085 A1 | 10/1989 |
| EP | 0848030 A1 | 6/1998 |
| EP | 1245607 A1 | 10/2002 |
| WO | WO-01/21681 A1 | 3/2001 |

* cited by examiner

*Primary Examiner*—Terressa Boykin
(74) *Attorney, Agent, or Firm*—Birch, Stewart, Kolasch & Birch, LLP

(57) ABSTRACT

The present invention relates to a process for preparing high molecular weight polycarbonate resin, particularly to a process for preparing high molecular weight polycarbonate resin, which conducts condensation polymerization of low molecular weight amorphous polycarbonate prepolymer prepared by transesterification of dialkyl(aryl)carbonate and aromatic hydroxy compound and solid state polymerization within short time to increase molecular weight. The present invention introduces condensation polymerization to lower mole fractions of arylcarbonate existing in unreacted diarylcarbonate, end groups of reaction by products of polymerization degree less than 3, and polycarbonate prepolymer obtained by transesterification, and thus can maximize molecular weight increase of polycarbonate after solid state polymerization and remarkably reduce time required for preparing polycarbonate of the same molecular weight. In addition, since the present invention does not use toxic substance phosgene, it has no danger and it can prevent deterioration, and it can prepare high molecular weigh polycarbonate that can be used for injection and extrusion.

5 Claims, 1 Drawing Sheet

METHOD FOR PREPARING HIGH MOLECULAR WEIGHT POLYCARBONATE

BACKGROUND OF THE INVENTION (a) Field of the Invention

The present invention relates to a method for preparing high molecular weight polycarbonate, more particularly to a method for preparing high molecular weight polycarbonate, which can maximize molecular weight increase of polycarbonate after solid state polymerization and remarkably reduce time required for preparing polycarbonate of the same molecular weight, by lowering mole fraction of arylcarbonate existing in the mixture of polycarbonate prepolymer, end groups of reaction by-products of which the degree of polymerization is less than 3, and unreacted diarylcarbonate through condensation polymerization.

(b) Description of the Related Art

Polycarbonate resin has superior heat resistance, impact resistance, mechanical strength, transparency, etc., and thus it is widely used for preparation of compact disc, transparent sheet, packaging material, automobile bumper, UV shielding film, etc. and its demand is in rapid increase.

Conventional polycarbonate preparation processes are divided into an interfacial polymerization process that uses phosgene and a melt polymerization and a solid state polymerization which do not use phosgene.

The interfacial polymerization process is to mix an aqueous solution of aromatic hydroxy compound such as bisphenol A with gas phase phosgene in an organic solvent to proceed polymerization in the interface between aqueous solution layer and organic solvent layer. Although this process can comparatively easily produce high molecular weight polycarbonate resin in continuous process, since it uses pollutant chlorine type solvent and toxic gas, it is very dangerous and thus enormous equipment cost is required. Meanwhile, the melt polymerization is to proceed polymerization while melting raw material, monomers. Although it has little danger because it does not use toxic substance, in order to produce high molecular weight polycarbonate for injection and extrusion, high temperature and high vacuum equipment is required when treating high viscous reactant and thus quality is lowered. In last, the solid state polymerization is to crystallize low molecular weight polycarbonate prepolymer and then proceed polymerization at temperature range lower than melting temperature. Since it does not use toxic substance and proceeds reaction in solid state, it can prevent deterioration.

However, since so far reported solid state polymerizations (U.S. Pat. Nos. 4,948,871 and 5,214,073) pass crystallization and solid state polymerization processes without removing unreacted diarylcarbonate and end groups of side-products of degree of polymerization less than 3 existing together with semi-crystalline prepolymer of comparatively low molecular weight (weight average molecular weight; 2,000~20,000 g/mol. Example maximum molecular weight; 15,000 g/mol) before solid state polymerization, molecular weight is at most 38,800 g/mol even after operating for more than 8 hours, due to large mole ratio difference between aromatic hydroxy group and arylcarbonate group. In addition, since such a mole ratio difference increases for enhancement of physical properties of polycarbonate resin, as molecular weight of prepolymer increases. Even if it is effective for physical properties, it has a bad influence on increase in molecular weight during solid state polymerization for the above mentioned reason. Other solid state polymerization processes (U.S. Pat. Nos. 5,717,056 and 5,905,135), for the above mentioned reason, conduct solid state polymerization using comparatively low molecular weight (viscosity average molecular weight: 4,800~18,000 g/mol) semi-crystalline prepolymer and thus molecular weight increase is at most 31,000 g/mol even after operating for 10 hours after compensating catalyst.

Accordingly, there is a need for studies for polycarbonate preparation process that can prevent deterioration and prepare high molecular weight polycarbonate within a short time.

SUMMARY OF THE INVENTION

In order to solve these problems, it is an object of the present invention to provide a process for preparing high molecular weight polycarbonate resin that can maximize molecular weight increase of polycarbonate after solid state polymerization and simultaneously remarkably reduce time required for preparing polycarbonate of the same molecular weight, by lowering mole fraction of arylcarbonate existing in the mixture of polycarbonate prepolymer, end groups of reaction by-products of which the degree of polymerization is less than 3, and unreacted diarylcarbonate through condensation polymerization.

It is another object of the present invention to provide high molecular weight polycarbonate, which does not use toxic substance phosgene and thus has no danger, can prevent deterioration, and can be used for injection and extrusion.

In order to achieve these objects, the present invention provides a process for preparing high molecular weight polycarbonate comprising the steps of:

a) melting dialkyl(aryl)carbonate and aromatic hydroxy compound and conducting transesterification thereof to prepare low molecular weight amorphous polycarbonate prepolymer with weight average molecular weight of 1,500~15,000 g/mol;

b) conducting condensation polymerization of the a) low molecular weight amorphous polycarbonate prepolymer to prepare middle molecular weight amorphous polycarbonate with weight average molecular weight of 20,000~30,000 g/mol;

c) conducting solvent induced crystallization of the b) middle molecular weight amorphous polycarbonate to prepare semi-crystalline polycarbonate; and d) conducting solid state polymerization of the c) semi-crystalline polycarbonate to prepare high molecular weight polycarbonate with weight average molecular weight of 35,000~200,000 g/mol.

DETAILED DESCRIPTION AND THE PREFERRED EMBODIMENTS

Figure 1:
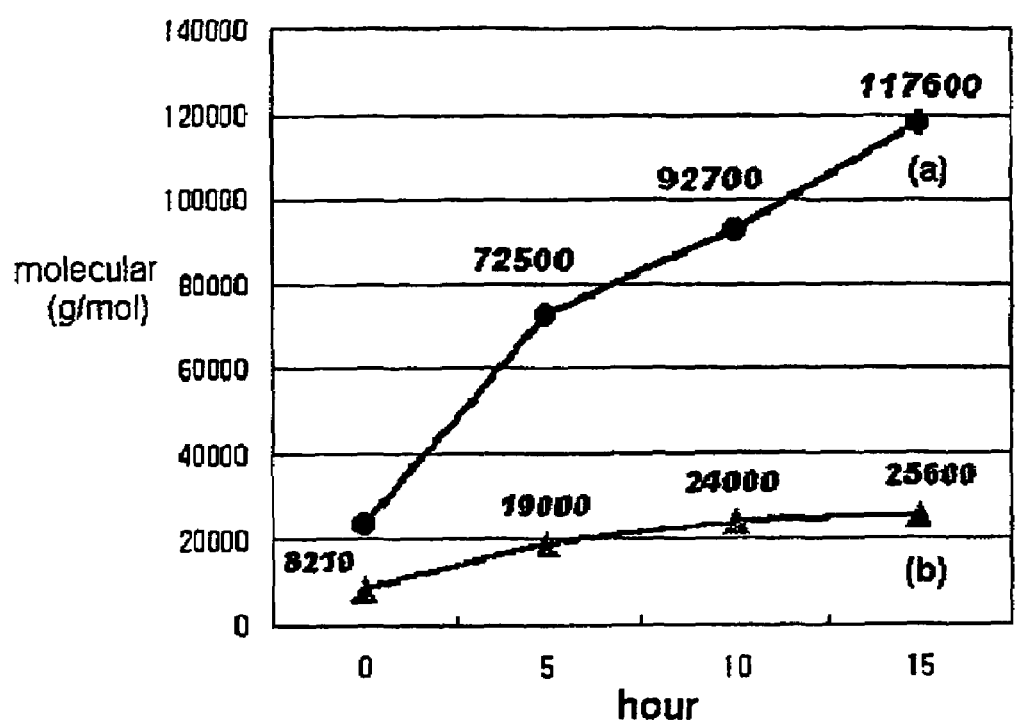
FIG. 1 is a graph showing molecular weight increases of (a) polycarbonate prepared by conducting solid state polymerization after condensation polymerization and (b) polycarbonate prepared by conducting solid state polymerization without conducting condensation polymerization according to the conventional process.

The present invention will now be explained in detail.

The present inventors, during studying for a method for improving molecular weight of polycarbonate within a short time, conducted condensation polymerization of low molecular weight amorphous polycarbonate prepolymer with weight average molecular weight of 1,500~15,000 g/mol prepared by transesterification of dialkyl(aryl)carbonate and aromatic hydroxy compound, and then removed unreacted dialkyl(aryl)carbonate and reaction by-products of low polymerization degree less than 3. As results, mole fraction of arylcarbonate in total end groups decreased to about 50.0~50.2%, and thus high molecular weight polycarbonate resin with weight average molecular weight of 35,000~200,000 g/mol can be prepared within a short time in solid state polymerization step, and compared to the conventional processes, time required for preparing polycarbonate resin of the same molecular weight can be remarkably reduced. Therefore, the present invention is based on the above discovery.

The present invention is characterized by conducting condensation polymerization of low molecular weight amorphous polycarbonate prepolymer with weight average molecular weight of 1,500~15,000 g/mol prepared by melting and transesterification of dialkyl(aryl)carbonate and aromatic hydroxy compound, removing unreacted dialkyl(aryl) carbonate and reaction by-products of low polymerization degree less than 3 to prepare middle molecular weight amorphous polycarbonate with weight average molecular weight of 20,000~30,000 g/mol, conducting solvent-induced crystallization of the middle molecular weight amorphous polycarbonate to prepare semi-crystalline aromatic polycarbonate, and then preparing high molecular weight polycarbonate resin of 35,000~200,000 g/mol by solid state polymerization within a short time.

The present invention can maximize molecular weight increase of polycarbonate after solid state polymerization and simultaneously remarkably reduce time required for preparing polycarbonate of the same molecular weight, by conducting condensation polymerization to lower mole fraction of arylcarbonate existing in the mixture of polycarbonate prepolymer, end groups of reaction by-products of which the degree of polymerization is less than 3, and unreacted diarylcarbonate through condensation polymerization. And, since the present invention does not use toxic substance phosgene, it has no danger, can prevent deterioration and can prepare high molecular weight polycarbonate that can be used for injection and extrusion.

The process of the present invention will be explained in detail.

First Process: Preparation of Low Molecular Weight Amorphous Polycarbonate Prepolymer This step is to melt and caise transesterification of dialkyl (aryl)carbonate and aromatic hydroxy compound to prepare low molecular weight amorphous polycarbonate prepolymer. Reaction by-products of the transesterification include dialkyl(aryl)carbonate unreacted after transesterification and reaction by-products of low degree of polymerization less than 3.

As the dialkyl(aryl)carbonate, diphenyl-carbonate, bischlorophenyl-carbonate, m-cresyl-carbonate, dinaphthyl-carbonate, dimethyl-carbonate, or dicyclohexyl-carbonate, etc. can be used.

As the aromatic hydroxy compound, bis(4-hydroxy phenyl)-methane, 2,2-bis(4-hydroxyphenyl)-propane, 2,2-bis(4-hydroxy-3,5-dibromophenyl)-propane, 1,4-dihydroxy-3-methyl-benzene, or bis(4-hydroxyphenyl)sulfide, etc. can be used.

In addition, in this transesterification step, it is preferable to mix the dialkyl(aryl)carbonate and aromatic hydroxy compound in a mole ratio of 1:1 to 1.1:1. Out of this mole ratio range, molecular weight of prepared polycarbonate prepolymer decreases, and excessively out of this range, reaction stops at the beginning.

After introducing dialkyl(aryl)carbonate and aromatic hydroxy compound mixed in the above mole ratio into a reactor, transesterification catalyst can be introduced. For example, alkali metal catalyst such as sodium hydroxide, potassium hydroxide, lithium hydroxide, sodium carbonate, potassium carbonate or lithium carbonate, etc., nitrogen base catalyst such as tetramethylammonium hydroxide (($CH_3$)$_4$NOH) or tetrabutylammonium hydroxide (($C_4H_9$)$_4$NOH), etc., or acid catalyst such as boric acid or phosphoric acid can be used.

As the reactor used for transesterification, general agitation type reactor equipped with reflux tower and condenser is preferable. First, dialkyl(aryl)carbonate and aromatic hydroxy compound are mixed in a mole ratio of 1:1 to 1.1:1 and temperature is elevated to melt them in a melting bath maintained at 150~200° C. under nitrogen atmosphere. After melting, raw material is introduced into an agitation type reactor of which jacket temperature is maintained 180~250° C. At this time, in order to prevent high temperature reactant from contacting with oxygen, air inside the reactor is substituted with nitrogen. After introducing reaction raw material, transesterification catalyst is introduced to initiate reaction. After reacting under atmospheric pressure of reduced pressure under nitrogen atmosphere to some extent, reaction by-products such as phenol produced during reaction is vaporized to remove under reduced pressure of 1~100 mmHg while preparing polycarbonate prepolymer. At this time, since reaction raw material dialkyl(aryl)carbonate may be vaporized together with reaction by-products, it is condensed in a reflux tower attached to the reactor to reflux to the reactor, and reaction by-products that was not liquefies in the reflux tower are condensed in a condenser and discharged out of the reactor to remove.

In the low molecular weight polycarbonate, final product of the transesterification of this step, unreacted dialkyl(aryl) carbonate that was not involved in the reaction and a small amount of reaction by-products of which the degree of polymerization was less than 3 exist like conventional processes.

The low molecular weight amorphous polycarbonate prepolymer prepared by the above process preferably has weight average molecular weight of 1,500~15,000 g/mol.

Second Process: Preparation of Middle Molecular Weight Amorphous Polycarbonate

This step is to conduct condensation polymerization of the low molecular weight polycarbonate prepolymer with weight average molecular weight of 1,500~15,000 g/mol prepared by the first process and remove dialkyl(aryl)carbonate unreacted after the transesterification of the first process and reaction by-products of low polymerization degree less than 3 and reaction by-products newly produced during reaction such as phenol under high temperature, reduced pressure conditions or by injecting nitrogen under atmospheric pressure, to prepare middle molecular weight non-crystalline polycarbonate.

In this condensation polymerization step, unreacted dialkyl(aryl)carbonate that was not involved in the reaction because of comparatively low boiling point and reaction by-products of polymerization degree less than 3 are vaporized and discharged out of the reactor together with reaction by-products phenol, which promotes molecular weight increase of polycarbonate in solid state polymerization compared to the conventional processes (U.S. Pat. Nos. 4,948 and 5,214,073). And, in conventional processes, reaction by-products of polymerization degree less than 3 and diarylcarbonate excessively used in transesterification step are not removed by condensation polymerization before solid state polymerization, and consequently, as molecular weight of prepolymer increases, mole ratio difference between aromatic hydroxy group and arylcarbonate of the produced prepolymer end increases, and thus long time is required for preparing high molecular weight polycarbonate in subsequent solid state polymerization. Specifically, as molecular weight of prepolymer increases, arylcarbonate of end groups exist in more excessive amount in conventional processes as shown in the following Equation, which has a bad influence on molecular weight increase.

When $2,000 \leq M_w \leq 5,000$, $50 < X \leq 100$,

When $5,000 \leq M_w \leq 20,000$, $0.002 M_w + 40 \leq X \leq 100$ ($M_w$: molecular weight of prepolymer, X: mole fraction of arylcarbonate included in total end groups)

In the present invention, unlike the conventional processes, unreacted dialkyl(aryl)carbonate that is rather excessively introduced in a transesterification and exists after reaction is completed and reaction by-products of polymerization degree less than 3 are previously removed through condensation polymerization step before solid state polymerization. Consequently, when the mole ratio of aromatic hydroxy compound group for alkyl(aryl)carbonate group out of functional groups of total reactant end is r, Xn, a degree of polymerization in solid state polymerization, can be represented by the following Mathematical Formula 1.

$$\overline{X}_u = \frac{1+r}{1+r-2rp}$$ [Mathematical Formula 1]

If p, the extent of reaction, is 1.0, the above Mathematical Formula 1 can be represented by the following Mathematical Formula 2, and thus polymerization degree can be maximized within a short time by controlling r close to 1.0.

$$\overline{X}_n = \frac{1+r}{1-r}$$ [Mathematical Formula 2]

According to the present invention, condensation polymerization of the amorphous polycarbonate prepolymer prepared in the first process is conducted and r value is controlled in the following range to maximize polymerization degree within a short time in solid state polymerization.

$0.9901 \leq r < 1.000$

For example, for preparing high molecular weight polycarbonate of molecular weight of 40,000, solid state polymerization time of the conventional process is 8 hours or more, while the present invention takes only 1 and half hour, which can reduce time by 5 times or more.

In the condensation polymerization, general condensation reactor can be used, and for example, rotating disk reactor, rotating cage reactor or thin film reactor can be used.

Reaction temperature is preferably 180~400° C., and more preferably 200~350° C. And, the condensation polymerization can be conducted with removing dialkyl(aryl) carbonate unreacted after transesterification, low polymerization degree reaction by-products of polymerization degree less than 3 and newly produced reaction by-products phenol at high temperature, under reduced pressure of 0~50 mmHg, more preferably under reduced pressure of 0~20 mmHg, or it can be conducted with removing reaction by-products by injecting nitrogen instead of vacuum condition. At this time, the amount of injected nitrogen is preferably 0.1 Nm$^3$/kg·h or more. Reaction time, although varied according to reaction conditions, is preferably 2~120 minutes.

The middle molecular weight amorphous polycarbonate prepared by the above process preferably has weight average molecular weight of 20,000~30,000 g/mol.

Third Process: Preparation of Semi-Crystalline Polycarbonate

This step is to prepare powdered semi-crystalline aromatic polycarbonate by solvent-induced crystallization of the middle molecular weight amorphous polycarbonate prepared in the second process.

The semi-crystalline polycarbonate can be prepared by general solvent-induced crystallization method as follows (Handbook of Polycarbonate Science and Technology, Donald G. Legrand, John T. Bendler, Marcel Dekker, Inc., 2000). According to the solvent-induced crystallization method, first, middle molecular weight amorphous polycarbonate prepared by the second process is dissolved in a solvent such as methylene chloride, chloroform, tetrahydrofuran, etc. so that its concentration becomes 0.01~0.5 g/mL at high or low temperature, and then precipitation is induced using non-solvent such as methanol, water, etc. to prepare crystalline polycarbonate. Second, middle molecular weight polycarbonate is dissolved in the solvent as used in the first method, and then solvent is evaporated to prepare crystalline polycarbonate. Third, amorphous polycarbonate of molten or solid state is swollen in poor solvent such as acetone, super critical bicarbonate, etc. of liquid or gas phase to prepare crystalline polycarbonate.

Semi-crystalline polycarbonate prepared by the above process preferably has average diameter of 0.01~5.0 mm, more preferably 0.05~3.0 mm.

Fourth Process: Preparation of High Molecular Weight Polycarbonate

This step is to conduct solid state polymerization of the semi-crystalline polycarbonate prepared in the third process to prepare high molecular weight polycarbonate with weight average molecular weight of 35,000~200,000 g/mol within a short time.

The semi-crystalline polycarbonate prepared in the third process is introduced in a solid state polymerization reactor, and nitrogen is continuously introduced or polymerization is proceeded under reduced pressure of 0~50 mmHg, preferably 0~20 mmHg, to remove reaction by-products to prepare high molecular weight polycarbonate resin with weight average molecular weight of 35,000~200,000 g/mol. At this time, the semi-crystalline polycarbonate can be pulverized to use before solid state polymerization, or it can be used without pulverization. Solid state polymerization is conducted under isothermal condition or with elevating temperature so that solid state polymerization temperature ($T_p$) can satisfy the following range.

$T_m - 50 \leq T_p < T_m$ ($T_m$ = melting temperature)

The polycarbonate resin of the present invention prepared by the above process has weight average molecular weight of 35,000~200,000 g/mol and can be used for injection and extrusion, and it can be prepared within a short time reduced 5 times or more compared to the conventional process.

In addition, according to the present invention, total time required for solid state polymerization is less than 2 hours, and high molecular weight polycarbonate with weight average molecular weight of 40,000 g/mol or more can be prepared within 1/3~1/5 times of the conventional process time.

The present invention will be explained in more detail with reference to the following Examples. However, these are to illustrate the present invention and the present invention is not limited to them.

EXAMPLE

Example 1

(Preparation of Low Molecular Weight Amorphous Polycarbonate Prepolymer)

Diphenylcarbonate and bisphenol A were mixed in a ratio of 1.05:1 to introduce into a reactor under nitrogen atmosphere, and then they were reacted while agitating at a jacket temperature of 230° C. for 5 minutes. Then, transesterification thereof was conducted under reduced pressure of 1~4 mmHg for 30 minutes to prepare lower molecular weight non-crystalline polycarbonate prepolymer with weight average molecular weight of 8,200 g/mol.

(Preparation of Middle Molecular Weight Amorphous Polycarbonate)

The low molecular weight non-crystalline polycarbonate prepolymer prepared in the above process was introduced into a rotating disk reactor, and condensation polymerization of polycarbonate was conducted for 80 minutes while continuously injecting nitrogen gas to prepare middle molecular weight non-crystalline polycarbonate with weight average molecular weight of 24,000 g/mol.

(Preparation of Semi-Crystalline Polycarbonate)

The middle molecular weight amorphous polycarbonate prepared in the above process was dissolved in chloroform so that its concentration became 0.1 g/mL, and 200% methanol was used as non-solvent to obtain powdered crystalline polycarbonate as precipitate. The average particle diameter of crystalline polycarbonate was 0.2 mm, and crystallinity as measured using differential scanning calorimeter was 21.1%.

(Preparation of High Molecular Weight Polycarbonate)

The powdered semi-crystalline polycarbonate prepared in the above process was introduced into a solid state polymerization reactor without a separate pulverization process, and solid state polymerization was conducted under isothermal condition of 200° C. while continuously introducing nitrogen at a speed of 3 L per minute. As result, 10 hours after reaction, high molecular weight polycarbonate reins with weight average molecular weight of 92,700 g/mol was prepared (FIG. 1, (a)).

Comparative Example 1

(Preparation of Semi-Crystalline Polycarbonate)

Powdered semi-crystalline polycarbonate was prepared by the same method as in Example 1, except that condensation polymerization step was not conducted. Average particle diameter was 0.15 mm, and crystallinity was 26.1%.

(Preparation of High Molecular Weight Polycarbonate)

Solid state polymerization of the powdered semi-crystalline polycarbonate prepared in the above process was conducted by the same method as in Example 1 to prepare polycarbonate with weight average molecular weight of 24,0000 g/mol, 10 hours after reaction (FIG. 1,(b)).

Comparative Example 2

(Preparation of High Molecular Weight Polycarbonate)

Polycarbonate resin with weight average molecular weight of 17,800 g/mol was prepared by the same method as in Comparative Example 1, except that reaction by-products produced during solid state polymerization was removed under reduced pressure condition.

Example 2

(Preparation of Middle Molecular Weight Amorphous Polycarbonate)

Middle molecular weight amorphous polycarbonate with weight average molecular weight of 26,000 g/mol was prepared by the same method as in Example 1, except that a thin film reactor for polymerization was used as a condensation polymerization reactor, and condensation polymerization was conducted at 270° C. under reduced pressure of 1~10 mmHg for 30 minutes while recycling molten prepolymer.

(Preparation of Semi-Crystalline Polycarbonate)

Semicrystalline polycarbonate with crystallinity of 20.3% was prepared using the middle molecular weight amorphous polycarbonate by the same method as in Example 1.

(Preparation of High Molecular Weight Polycarbonate)

Solid state polymerization of the semi-crystalline polycarbonate was conducted by the same method as in Example 1 to prepare polycarbonate resin with weight average molecular weight of 100,800 g/mol, 10 hours after reaction.

Example 3

(Preparation of High Molecular Weight Polycarbonate Resin)

Polycarbonate resin with weight average molecular weight of 69,500 g/mol was prepared 10 hours after reaction by the same method as in Example 1, except that reaction by-products produced during solid state polymerization process was removed at 200° C. under reduced pressure of 1 mmHg.

From the Examples 1 to 3 and Comparative Examples 1 and 2, it can be confirmed that the high molecular weight polycarbonates of Examples 1 to 3, which were prepared according to the present invention by conducting condensation polymerization of low molecular weight amorphous polycarbonate prepolymer and then conducting solid state polymerization, increased weight average molecular weight by 1.8~2.6 times (as result of solid state polymerization for 10 hours), compared to those of Comparative Examples 1 and 2, which were prepared according to the conventional process by conducting solid state polymerization without conducting condensation polymerization. In addition, time for preparing polycarbonate of the same molecular weight was reduced to 1/3~1/5. And, high molecular weight polycarbonate resin with 100,000 g/mol or more, which could not be obtained within 10 hours by the conventional solid state polymerization, could be prepared within 10 hours, and polycarbonate resin with weight average molecular weight of 40,000 g/mol, which could be obtained by conducting solid state polymerization for 10 hours by the conventional process, could be prepared within 1 hour and 30 minutes.

The process of the present invention can maximize molecular weight increase of polycarbonate after solid state polymerization and simultaneously can prepare high molecular weight polycarbonate with weight average molecular weight of 35,000~200,000 g/mol that can be used for injection and extrusion within ⅓~⅕ times of the conventional process time, by conducting condensation polymerization process to lower mole fractions of arylcarbonate existing in unreacted diarylcarbonate, end groups of reaction by products of polymerization degree less than 3, and polycarbonate prepolymer obtained by transesterification. In addition, since the present invention does not use toxic substance phosgene, it has no danger and it can prevent deterioration.

What is claimed is:

1. A process for preparing high molecular weight polycarbonate resin comprising the steps of:
    a) melting dialkyl(aryl)carbonate and aromatic hydroxy compound and conducting transesterification thereof to prepare low molecular weight amorphous polycarbonate prepolymer with weight average molecular weight of 1,500~15,000 g|mol;
    b) conducting condensation polymerization of the a) low molecular weight amorphous polycarbonate prepolymer under pressure of 0~50 mmHg or nitrogen gas in an amount of at least 0.1 $Nm^2/kg \cdot h$ for 2~120 minutes, to prepare middle molecular weight amorphous polycarbonate with weight average molecular weight of 20,000~30,000 g/mol and remove unreacted dialkyl (aryl)carbonate and by-products of low polymerization degree less than 3 in step a);
    c) conducting solvent-induced crystallization of the b) middle molecular weight amorphous polycarbonate to prepare semi-crystalline polycarbonate; and
    d) conducting solid state polymerization of the c) semi-crystalline polycarbonate to prepare high molecular weight polycarbonate with weight average molecular weight of 35,000~200,000 g/mol.

2. The process for preparing high molecular weight polycarbonate resin according to claim 1, wherein the b) condensation polymerization is conducted in a reactor selected from a group consisting of a rotating disk reactor, rotating cage reactor and a thin film reactor.

3. The process for preparing high molecular weight polycarbonate resin according to claim 1, wherein the mole ratio (r) of diaryl carbonate and aromatic hydroxy compound of the middle molecular weight amorphous polycarbonate prepared in step b) is in the range of $0.9901 \leq r < 1.000$.

4. The process for preparing high molecular weight polycarbonate resin according to claim 1, wherein the d) solid state polymerization is conducted within 2 hours.

5. The process for preparing high molecular weight polycarbonate resin according to claim 1, wherein in step a), the dialkyl(aryl)carbonate and aromatic hydroxy compound are mixed at aratio of 1:1 to 1.1:1.

* * * * *